(12) United States Patent
Hayashi

(10) Patent No.: US 6,762,799 B2
(45) Date of Patent: Jul. 13, 2004

(54) IMAGE DATA SYNCHRONIZING APPARATUS AND METHOD

(75) Inventor: Kenkichi Hayashi, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 588 days.

(21) Appl. No.: 09/736,413

(22) Filed: Dec. 15, 2000

(65) Prior Publication Data

US 2001/0004272 A1 Jun. 21, 2001

(30) Foreign Application Priority Data

Dec. 15, 1999 (JP) ............................................ 11-355569

(51) Int. Cl.$^7$ .............................. H04N 5/04; H04N 9/64
(52) U.S. Cl. ...................... 348/571; 348/714; 348/222.1
(58) Field of Search ................. 348/714, 564, 348/463, 231.99, 230.1, 500, 571, 572, 567, 576, 441, 458, 222.1; 358/453, 444, 445

(56) References Cited

U.S. PATENT DOCUMENTS

| | | | | |
|---|---|---|---|---|
| 5,029,326 A | * | 7/1991 | Tabata | 348/458 |
| 5,136,390 A | * | 8/1992 | Inova et al. | 348/383 |
| 5,166,801 A | * | 11/1992 | Yoshikawa | 348/383 |

* cited by examiner

Primary Examiner—Michael H. Lee
(74) Attorney, Agent, or Firm—Birch, Stewart, Kolasch & Birch, LLP

(57) ABSTRACT

One frame of an image having 1312 pixels in the horizontal direction thereof is divided into 192 pixels at a time in the horizontal direction to obtain a plurality of image areas. The one frame of image data is subjected to synchronization processing repeatedly using a line memory that is capable of storing 192 pixels of data.

8 Claims, 3 Drawing Sheets

IMAGE DATA SYNCHRONIZING APPARATUS AND METHOD

BACKGROUND OF THE INVENTION

1. Field of the Invention

This invention relates to an apparatus and method for synchronizing and outputting image data.

2. Description of the Related Art

When image processing is executed using a portion of an image composed of a plurality of horizontal lines of an image of one frame, as in the manner of digital filtering processing, it is necessary to store temporarily one horizontal line's worth of image data using a line memory and to execute synchronization processing. Image processing is executed using the one line's worth of image data that has been stored temporarily in the line memory and the succeeding line of image data, which has not been directed through the line memory.

CCDs having greater numbers of pixels are being produced, and the number of pixels on one horizontal line has become extremely high. The inevitable outcome is an increase in the capacity of the line memory that stores one horizontal line's worth of data. There is an increase also in the cost of the line memory and in the power consumed by the line memory itself.

DISCLOSURE OF THE INVENTION

Accordingly, an object of the present invention is to realize the synchronization processing of image data without increasing the capacity of a line memory.

According to the present invention, the foregoing object is attained by providing an image data synchronizing apparatus comprising an extraction device for extracting one horizontal line of image data in a plurality of image areas, which are obtained when one frame of an image has been divided in the horizontal direction, on a per-image-area basis from applied image data representing one frame of the image; and a line memory for storing temporarily the image data that has been extracted by the extraction device, the line memory having a capacity for an amount of data approximately equal to that of the one horizontal line of image data in each image area.

The present invention provides also a method suited to the apparatus described above. Specifically the method comprises the steps of: extracting one horizontal line of image data in a plurality of image areas, which are obtained when one frame of an image has been divided in the horizontal direction, on a per-image-area basis from applied image data representing one frame of the image; storing the extracted image data temporarily in a line memory having a capacity for an amount of data approximately equal to that of the one horizontal line of image data in each image area; and outputting the image data from the line memory.

In accordance with the present invention, one line's worth of image data in a plurality of image areas, which are obtained when one frame of an image has been divided in the horizontal direction, is extracted on a per-image-area basis from applied image data representing one frame of the image. The extracted image data is stored temporarily in the line memory and is then output from the line memory.

Thus the extracted item of image data and the item of image data that has been stored temporarily in the line memory and read out of the line memory are obtained simultaneously.

According to the present invention, it will suffice if the capacity of the line memory that stores the image data is large enough to store one line's worth of image data of one image area. Since it is unnecessary to store one horizontal line of image data of one entire frame of an image, the capacity of the line memory can be reduced. This means that even if the CCD for obtaining the image data is provided with a large number of pixels, synchronization processing can be achieved using a line memory having a small capacity.

An arrangement may be adopted in which the mutually adjacent portions of neighboring image areas are overlapped.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail.

The manner in which synchronization processing is executed will be described first.

Figure 1:
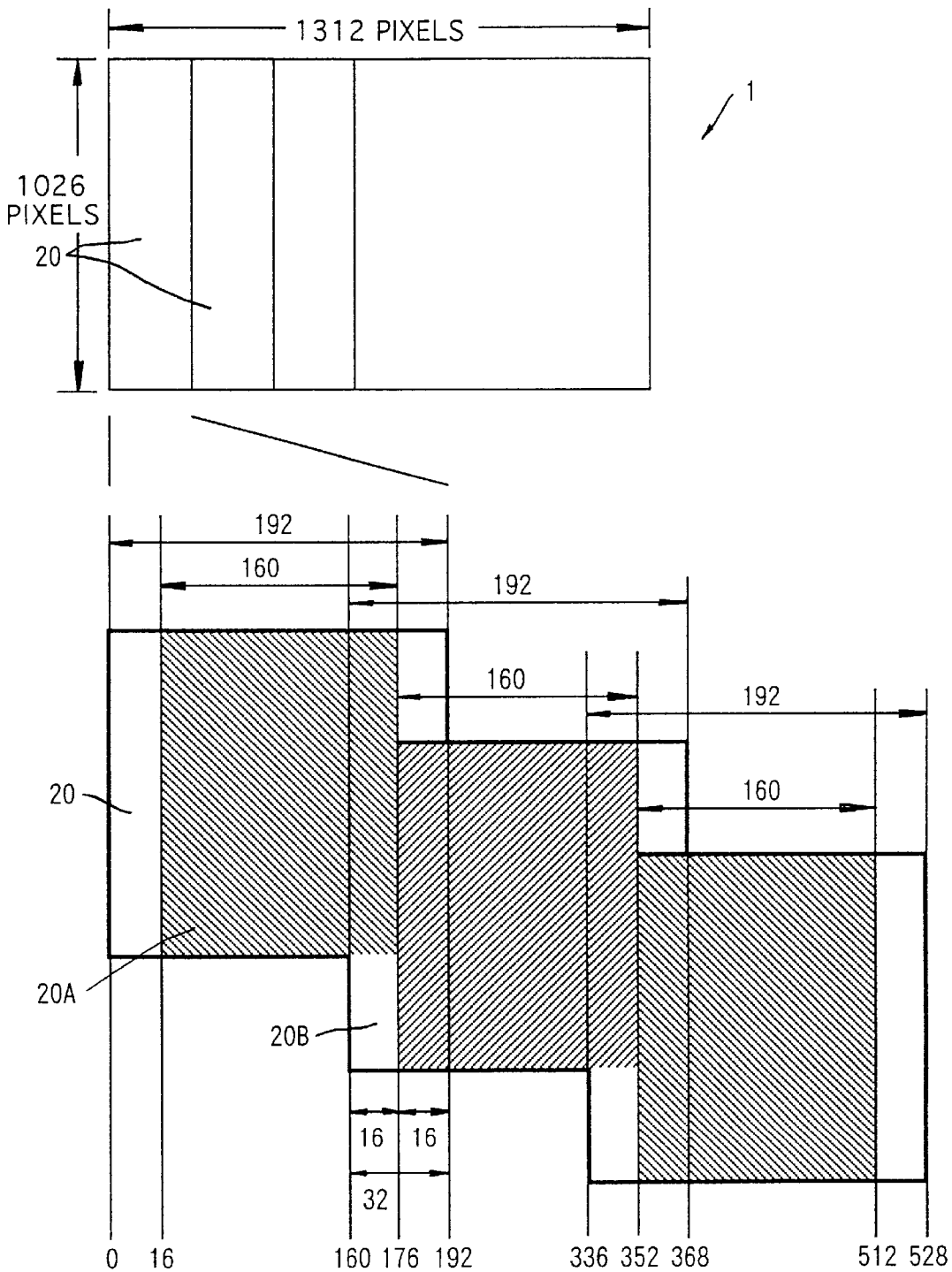
FIG. 1 illustrates the photoreceptor area of a CCD and image areas into which the photoreceptor area has been partitioned.

FIG. 1 is a diagram illustrating the photoreceptor area of a CCD 1.

The CCD 1 has 1312 pixels in the horizontal direction and 1026 pixels in the vertical direction, for a total of about 1,350,000 pixels. Assume that there are a plurality of image areas 20 obtained when the photoreceptor area of the CCD 1 is divided into areas of 192 pixels each in the horizontal direction. When the division into 192 pixels in the horizontal direction is performed, the image areas 20 are demarcated in such a manner that neighboring image areas overlap each other by 32 pixels (=16 pixels×2) in the horizontal direction (the overlapping portions of 32 pixels are indicated at 20B).

Each image area 20 obtained by division into 192 pixels horizontally has a central image area 20A (indicated by the hatching) composed of 160 pixels horizontally obtained by excluding 16 pixels along both edges. The image data representing the image area 20A is subjected to data processing that will be described later.

Figure 2:
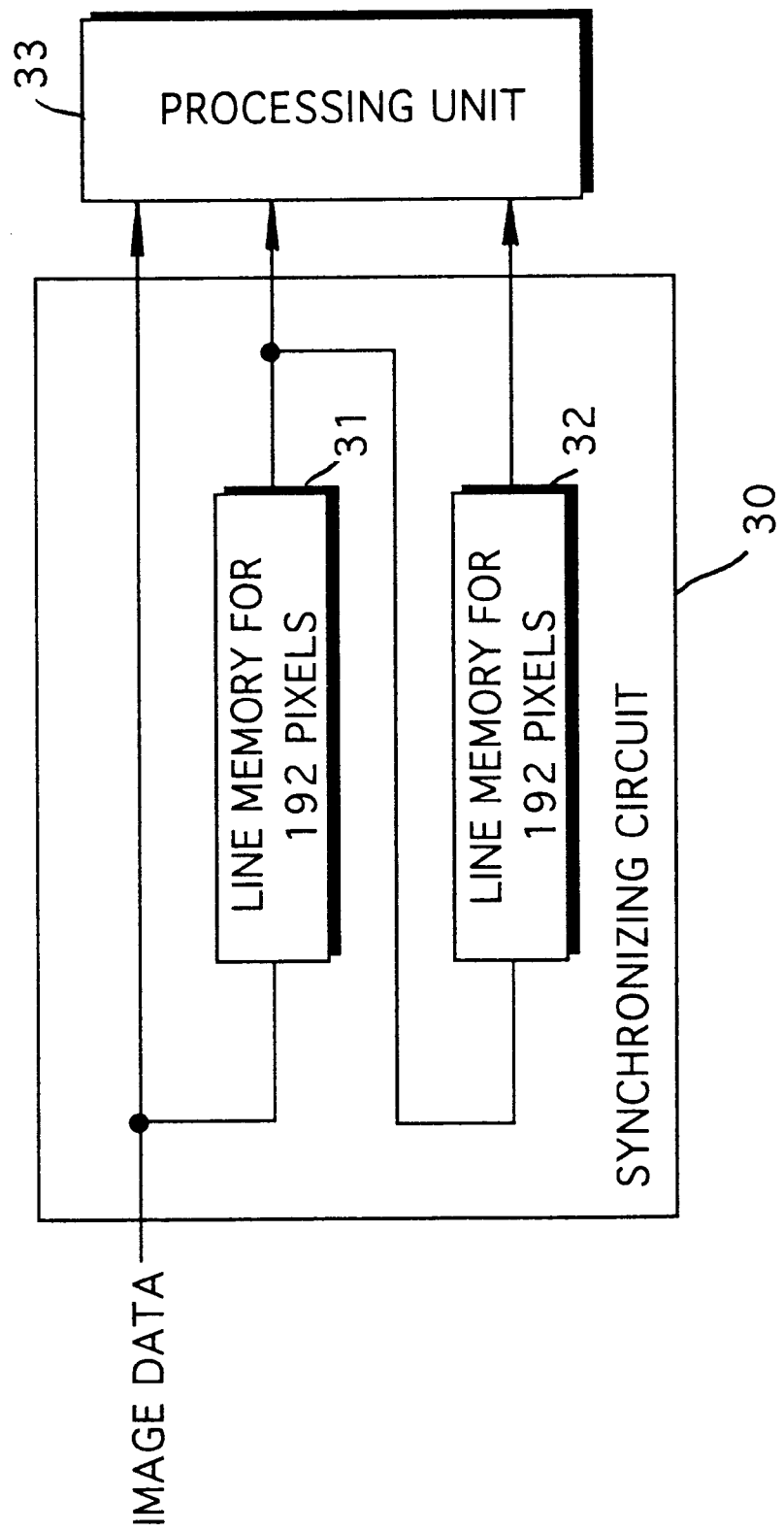
FIG. 2 illustrates the electrical construction of a synchronizing circuit.

FIG. 2 is a block diagram illustrating the electrical construction of a synchronizing circuit 30.

One horizontal line (192 pixels) of image data of the image area 20 obtained by division as set forth above is input to the synchronizing circuit 30. This one horizontal line of image data enters a first line memory 31 for 192 pixels, where this one horizontal line of image data is stored temporarily.

The one horizontal line of image data that has been stored in the first line memory 31 forms part of the output of the synchronizing circuit 30 and is input to a processing unit 33, which is the stage that immediately follows the synchronizing circuit 30. The image data that has been output from the first line memory 31 is input also to a second line memory 32 for 192 pixels, where this image data is stored temporarily. Image data output from the second line memory 32 also forms part of the output of the synchronizing circuit 30 and is input to the processing unit 33.

The image data that has entered the synchronizing circuit 30 also is output from the synchronizing circuit 30 merely by passing therethrough.

The synchronizing circuit 30 outputs the present image data of 192 pixels, image data delayed from the present image data by one horizontal line in the image area 20, and image data delayed from the present image data by two horizontal lines in the image area 20. These items of image data enter the processing unit 33, which proceeds to apply predetermined processing to 160 pixels of image data corresponding to the image area 20A.

The synchronization processing by the synchronizing circuit 30 is repeatedly applied to the image data representing one frame of the image.

The size of the portion 20B at which the neighboring image areas 20 overlap each other may be changed in conformity the content of processing executed by the processing unit 33 on the output side of the synchronizing circuit 30.

Figure 3:
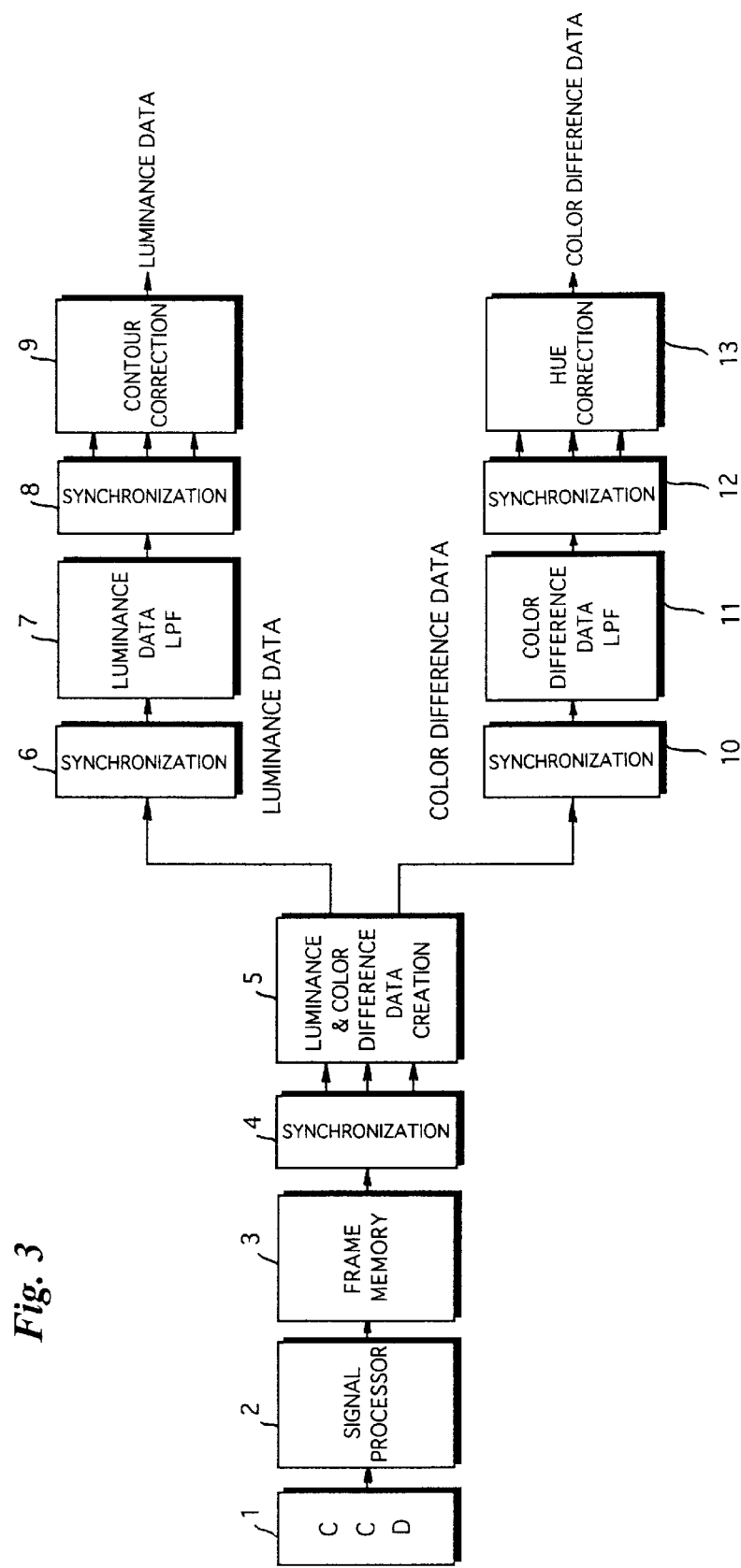
FIG. 3 illustrates part of the electrical structure of a digital camera.

FIG. 3 is a block diagram illustrating the electrical structure of a digital camera.

Synchronizing circuits 4, 6, 8, 10 and 12 in FIG. 3 each have a structure identical with that of the synchronizing circuit 30 illustrated in FIG. 2.

Image data representing the image of a subject is output from the CCD 1 in response to imaging of the subject. One frame of the image data output from the CCD 1 enters a signal processing circuit 2, where the image data is subjected to predetermined signal processing such as analog-to-digital conversion processing, gamma correction processing and the like. The one frame of image data output from the signal processing circuit 2 is applied to a frame memory 3, where the data is stored temporarily.

Image data representing the image area 20A obtained by dividing one frame of an image into the image areas 20A is read out one line at a time (192 pixels at a time) by addressing the frame memory 3. The image data that has been read out of the frame memory 3 is input to the synchronizing circuit 4.

Image data that has been synchronized in the synchronizing circuit 4 is input to a circuit 5, which creates luminance data and color difference data from the entered image data.

The luminance data is applied to the synchronizing circuit 6, which executes synchronization processing again. The luminance data output from the synchronizing circuit 6 enters a luminance-data low-pass filter 7, where the data is subjected to filtering processing. The luminance data is subjected to synchronization processing again in the synchronizing circuit 8 and is then input to a contour correction circuit 9. Here the data is subjected to contour correction processing, after which the processed data is output.

The color difference data that has been created in the circuit 5 is synchronized by the synchronizing circuit 10 in a manner similar to that of the luminance data and then is input to a low-pass filter 11 for color difference data. The color difference data is synchronized again in the synchronizing circuit 12 again and then enters a hue correction circuit 13. The latter subjects the color difference data to hue correction processing and outputs the processed signal.

The luminance data output from the contour correction circuit 9 and the color difference data output from the hue correction circuit 13 is subjected to compression processing and the compressed data is recorded on a memory card or the like.

Thus, synchronization processing can be executed using a line memory which stores fewer pixels (192 pixels) than the number of pixels (1312 pixels) in the horizontal direction of the CCD 1.

Although the foregoing embodiment has been described with regard to an example applied to a digital camera, the present invention is no way limited to application solely to a digital camera.

As many apparently widely different embodiments of the present invention can be made without departing from the spirit and scope thereof, it is to be understood that the invention is not limited to the specific embodiments thereof except as defined in the appended claims.

What is claimed is:

1. An image data synchronizing apparatus comprising:

an extraction device for extracting one horizontal line of image data from a plurality of horizontal image areas, the plurality of horizontal image areas having reduced pixels and being obtained when one frame of an image is divided in the horizontal direction, on a per-image-area basis from applied image data representing one frame of the image; and a line memory for storing temporarily the one horizontal line of image data that is extracted by said extraction device, said line memory only having a capacity for an amount of data approximately equal to that of the one horizontal line of image data which is equivalent to each individual image area, wherein the one frame of image data is divided horizontally in such a way that reduced pixel values are created for each image area.

2. The apparatus according to claim 1, wherein said extraction device extracts one horizontal line of image data from the plurality of image areas, a portion of which is overlapped by a neighboring image area.

3. An image data synchronizing method comprising the steps of:

extracting one horizontal line of image data from a plurality of horizontal image areas, the plurality of image areas having reduced pixels and being obtained when one frame of an image is divided in the horizontal direction, on a per-image-area basis from applied image data representing one frame of the image;

storing the extracted image data temporarily in a line memory only having a capacity for an amount of data approximately equal to that of the one horizontal line of image data, which is equivalent to each individual image area, the one frame of image data being divided horizontally in such a way that the reduced pixel values are created for each image area; and outputting the image data from the line memory.

4. The apparatus according to claim 1, wherein each of the plurality of horizontal image areas has a central image area that is subjected to data processing.

5. The apparatus according to claim 4, wherein each central image area is composed of at least 160 pixels.

6. The apparatus according to claim 1, wherein the capacity for the line memory is at least 192 pixels.

7. The apparatus according to claim 2, wherein the portion at which the neighboring image area overlap each other may be changed.

8. The apparatus according to claim 1, wherein the one frame of image is divided into at least 192 pixels at a time in the horizontal direction to obtain the plurality of image areas.

* * * * *